March 24, 1959
R. J. BUSH
2,878,535
SEALING STRIP
Filed March 17, 1955
2 Sheets-Sheet 1
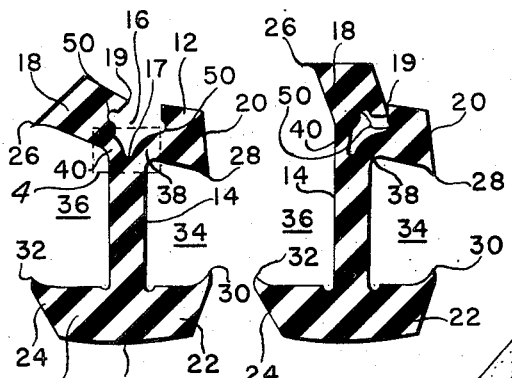
Fig. 1
Fig. 2
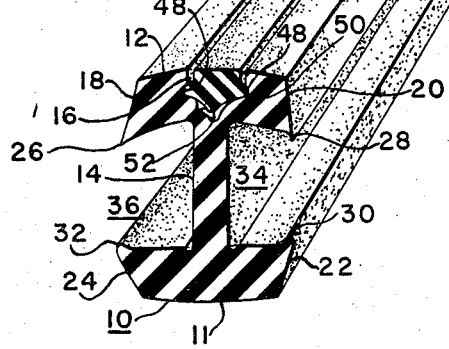
Fig. 3
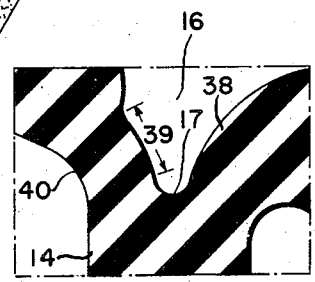
Fig. 4
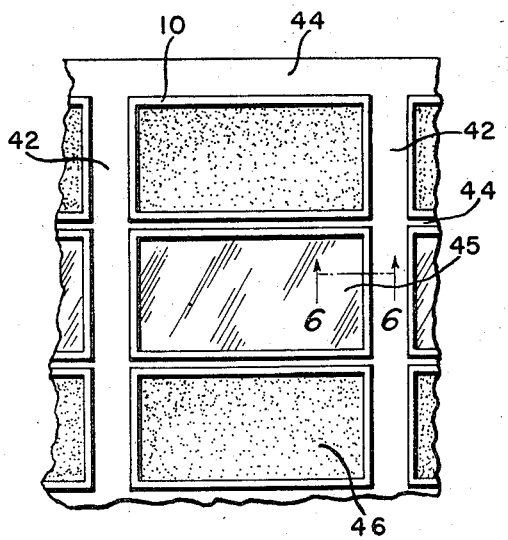
Fig. 5
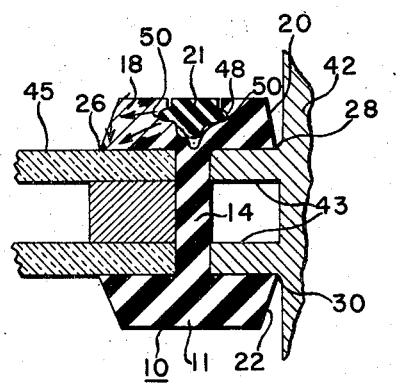
Fig. 6
INVENTOR.
Russell J. Bush
BY
His Attorney March 24, 1959 R. J. BUSH 2,878,535
SEALING STRIP
Filed March 17, 1955 2 Sheets-Sheet 2

INVENTOR.
Russell J. Bush
BY
His Attorney

United States Patent Office 2,878,535
Patented Mar. 24, 1959

2,878,535
SEALING STRIP

Russell J. Bush, Dayton, Ohio, assignor to General Motors Corporation, Detroit, Mich., a corporation of Delaware Application March 17, 1955, Serial No. 494,858

2 Claims. (Cl. 20—56.4)

This invention relates to the construction of buildings and more particularly to devices for joining relatively heavy panels used in building construction.

Elastomeric connector strips have in the past been developed and widely used for mounting and cushioning relatively small, light weight panels such as windows in automobile bodies. These connector strips generally consist of a relatively light weight elongated elastomeric body of circular or elliptical configuration having grooves therein for receiving the edges of glass and/or metal sheets to be joined. One form of these connectors is disclosed in U.S. Patent 2,189,138 and includes a V-shaped wedge insertable in a wedge receiving recess whereby the elastomeric material is crowded to cause the grooves to engage the glass or metal sheets more tightly. Other forms include a cylindrical wedge insertable in a cylindrical groove for the same purpose. These connector strips in enlarged form and with obvious modifications are not suitable for mounting or joining relatively thick and heavy panels for reasons which will be hereinafter indicated.

It is accordingly an object of this invention to construct a panel connector member which may be readily assembled with panels and which is adapted to securely and sealingly join relatively heavy structural members.

It is another object of this invention to provide a connector for joining relatively heavy panels which consists of a relatively heavy elastomeric body having opposed channels for receiving panels and means whereby the connector and panels are readily and firmly assembled without impairing the structural strength of the connector.

It is a further object of this invention to provide a relatively heavy elastomeric member for connecting relatively heavy building construction panels and frame members which consists of an elastomeric body having opposed channels for receiving structural members, means whereby one of the channels has a portion readily maintained in a divergent relation during the assembly operation and means whereby the side walls of the channels are maintained in a convergent and sealing relation after the assembly operation.

Further objects and advantages of the present invention will be apparent from the following description, reference being had to the accompanying drawings wherein preferred embodiments of the present invention are clearly shown.

In the drawings:

Figure 1 is a sectional view of one form of connector strip prior to use and made in accordance with the present invention.

Figure 2 is the connector shown in Figure 1 in slightly modified form.

Figure 3 is a perspective of the connector shown in Figure 1 including a wedge.

Figure 4 is an enlarged fragmentary section of Figure 1.

Figure 5 is a perspective of panels mounted in accordance with the present invention.

Figure 6 is an enlarged section taken along line 6—6 of Figure 5.

Figure 7:
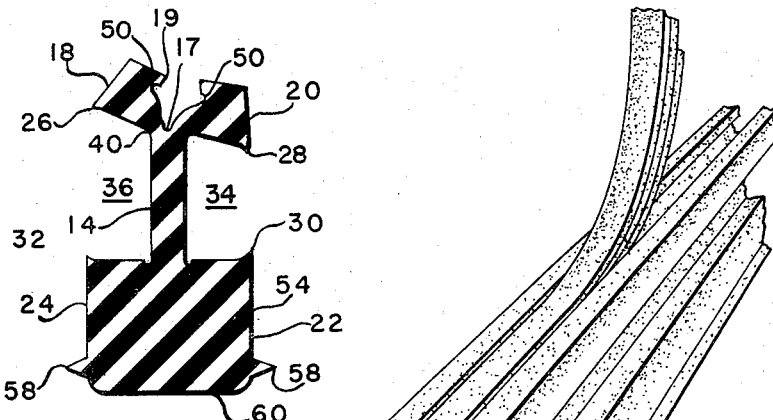
Figure 7 is a sectional view of another form of connector strip prior to use made in accordance with the present invention.

Referring now to the drawings, Figure 3 shows in perspective an assembled connector member made in accordance with the present invention. In general, it consists of a strip 10 having a pair of relatively thick and generally parallel portions 11 and 12 connected by a relatively thinner connecting member 14. The portion 12 has a wedge receiving recess 16 having a filler or wedge 21 therein.

As seen in reference to Figure 1, which is a cross sectional view of the connector having the wedge 21 removed in a form prior to use, parallel portions 11 and 12 include extended or wing portions 18, 20, 22 and 24 of substantial thickness terminating in lips 26, 28, 30 and 32, respectively, which together with connecting member 14 define channel 34 having a decreasing width toward its lips 28 and 30 and channel 36 having a somewhat increasing width toward its lips 26 and 32. Channel 36 is shown as being somewhat deeper than channel 34 and is adapted to receive "Thermo Pane" or other heavy window pane structure.

The wedge receiving recess 16 is disposed longitudinally of the strip along the longitudinal axis of connecting member 14 and is generally V-shaped, the apex 17 thereof terminating near to the connecting member 14, whereby the wing or extended portions 18 and 20 are connected to connecting member 14 by relatively thin web portions 38 and 40, the detail of which is more clearly shown in Figure 4 and will be hereinafter more specifically described. As is seen in Figure 3 channel 36 also has a decreasing width toward its lips 26 and 32 when wedge 21 is inserted in wedge receiving recess 16.

Figure 5 shows in front elevation a portion of the wall of a building assembled in accordance with the present invention. The wall consists of a frame structure of, for example, aluminum having upright members 42 and cross members 44, and panel members 46 and panes 45, which are joined to the frame members 42 and 44 by means of connectors 10. In joining the panes 45 and panels 46 to the frame members 42 and 44, members 10 are first joined with the frame member 42, channel 34 of strip 10 receiving flanged portions 43 of the frame members as shown in Figure 6. To effect this joint, members 20 and 22 need to be spread only a relatively small amount to receive flanges 43, and due to the inwardly diverging curvature of the inner faces of wing portions 20 and 22 toward the connecting member 14 and the inwardly directed lips 28 and 30, a relatively tight seal is effected between strip 10 and frame members 42. As shown in Figure 2, wing member 18 is then bent back to permit the insertion of pane 45 or panel 46. After insertion of pane 45 or panel 46, wedge 21 is inserted as is well known in the art to force wing members 18, 20, 22 and 24 into tight engagement with the frame and panel members, the details of which involve essential features of the present invention which will be hereinafter clearly described.

An essential feature of this invention lies in providing a structure whereby wing member 18 may be readily bent back sufficiently to receive panels after strips 10 have been mounted on frame members of a wall without impairing the strength of web 40, Figure 4. It should be appreciated that the connector 10 is relatively heavy and its various portions are relatively thick. For example, parallel portions 11 and 12 may be well over an inch in width and ½ inch in thickness while the thickness of connector 10 may be in the neighborhood of 2½ inches longitudinally of connecting member 14. Structural requirements may dictate that connecting member 14 not be more than ¼ inch in thickness. In order that webs 38 and 40 be relatively rigid and suitable for holding heavy panels, it is desirable that portion 17 of depression 16 is not extended into connecting portion 14. In order that wing member 18 be bent back sufficiently to permit the insertion of panels, wedge receiving depression 16 is designed to permit edge 19 to recede into it as shown in Figure 2. Further, web 40 is made appreciably thinner, preferably from .093" to .100", over a substantially uniform portion 39 as shown in Figure 4. It has been found that this construction permits the bending back of wing portion 18 sufficiently to permit the insertion of panels into channel 36 without impairing or fracturing the web 40 which would otherwise result. It should be noted that this feature provides a structure wherein wing portions 18 and 20 are relatively rigid and heavy in spite of connecting member 14 being relatively thin and yet wherein wing portion 18 may be bent back sufficiently to permit insertion of panels without fracturing or otherwise impairing the strength of web 40.

After the connector has been mounted on frame members 42 and 44 and panels 45 and 46 inserted within channels 36 of connector 10, wedge 21 is inserted as is well known in the art. As shown in Figure 3, strip 21 is provided with lateral ridges 48 which seat in corresponding grooves 50 of depression 16. Wedge 21 has a lower portion 52 terminating in a relatively flat V shape. It is an essential feature of this invention that the bottom portion 52 of strip 21 not compressively contact base portions of depressions 16 so that, as may be more clearly seen from examining Figure 6, compressive forces between wing portions 18 and 20 and wedge 21 act substantially in the vicinity of ridges 48 and grooves 50 and substantially on a horizontal plane thereof which in turn interact with vertical compressive forces between wing members 18 and 20 and the edges of pane 45 and frame portions 43 respectively to provide resultant forces directed toward the lips 26 and 28 as shown by arrows to provide a tight sealing engagement. It is obvious that similar interaction of parts will result with respect to parallel member 11. For best results wedge 21 is made of a relatively harder rubber than the strip 10 and is provided with a V-shaped base as indicated above to prevent the wedge from deforming laterally or vertically under the compressive forces involved.

It has been found that the desired results are attained when the wedge 21 has approximately 10 points greater hardness than strip 10 as determined by durometer type "A" manufactured by the Shore Manufacturing Co. A suitable connector is formed wherein strip 10 has a hardness of 70±5 points as above measured and a wedge 21 having a 10 point greater hardness.

Figure 8:
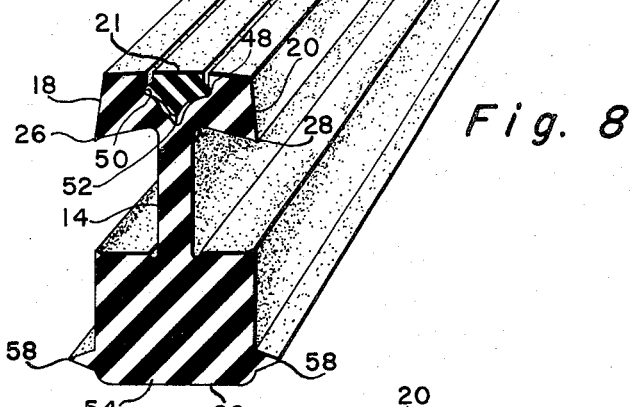
Figure 8 is a perspective of the connector strip shown in Figure 7 including a wedge.
Figure 9:
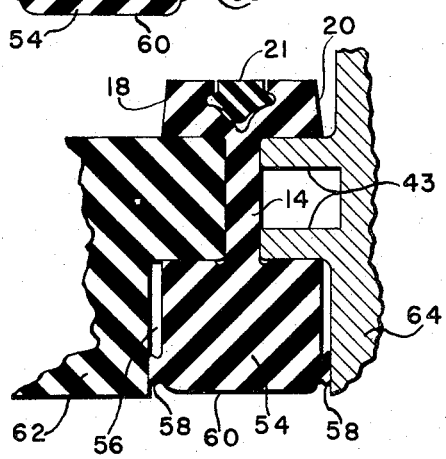
Figure 9 is the connector strip shown in Figure 8 in combination with wall structural members.

Another embodiment of the present invention is shown in Figures 7-9. The connector shown is similar in all respects to the connector previously discussed except that the parallel portion 11 of Figure 1 is made substantially thicker as 54 of Figure 7. This connector is suitable for joining structural members of substantially greater thickness than those joined by the connector shown in Figure 1. Relatively thick portions 54 fill in spaces, as for example, 56 of Figure 9, which would otherwise mar the appearance of the wall and allow dust or debris to accumulate therein. Extended portions 54 are preferably provided with laterally projecting portions 58 disposed near the end 60 of portion 54 which are compressed between panel members 62 and 64 to provide a seal.

Connectors made in accordance with the present invention have a variety of uses. Their application to external wall construction has already been mentioned. Another example which may be mentioned is in the construction of partitions for rooms, particularly in the partition of office space which from time to time may require altering. It is obvious that partitions constructed of a plurality of points joined by the present connectors may be easily altered to provide windows, glazed windows or opaque sections between spaces as desired by the occupant and still provide a sturdy structure and a neat appearance.

The elastomeric material referred to herein may include any of the usual materials that are vulcanizable such as natural rubber, butadiene-styrene copolymers, neoprene, butadiene-acrylonitrile copolymers, polychloroprene, etc., compatible mixtures thereof and certain vinyls.

The connectors may be formed by well known extruding or molding processes and may be supplied in long lengths from which desired lengths may be cut for a particular purpose either before or at the time of installation.

Corners may be mitered or molded integral into the strips as is convenient and desired.

While the embodiments of the present invention as herein disclosed, constitute preferred forms, it is to be understood that other forms might be adopted.

What is claimed is as follows:

1. An elastomeric sealing strip for joining a pair of building construction panels both having a width of relatively thick cross section, comprising, a pair of relatively thick and generally parallel portions including wings of substantial thickness terminating in lips, a relatively thinner central member connecting said parallel portions in a generally H-shaped cross section providing two channels having a width substantially that of the thick cross section of the building panels on each of opposite sides of said central member except for across said lips which are inwardly directed toward each other for sealing against the building panels, one of said relatively thick parallel portions having a wedge-receiving depression located substantially in alignment with a plane through said central member and located intermediate a pair of said wings, a wedge adapted for insertion in said wedge-receiving depression and having a lower portion terminating in a relatively flat V shape, a pair of lateral ridges provided by an upper portion of said wedge, said wings each providing a groove relative to which said ridges are inserted and provide compressive force relative to said wings, said wedge being made of a resilient material and having said V-shaped lower portion free of deformation and/or compressive contact laterally and vertically under the compressive forces involved, only said wings and said ridges interacting subject to the compressive forces, a nonuniform first web portion that has a continual progressively greater thickness approaching and adjacent to one of said wings providing the groove and that is relatively thinner only immediately adjacent to said central member and connecting one of said wings and said central member, and a second web portion differing from said first web portion by having both a nonuniform section of progressively greater thickness immediately adjacent to the other of said wings providing the groove and having a hinge section immediately adjacent to said central member with said hinge section having a substantially uniform thickness less than a remainder of said second web portion which includes the nonuniform section of progressively greater thickness remote from said central member and attached to one wing, said substantially uniform portion of said second web portion extending substantially one-half the distance between said central member and said one wing and serving critically as a hinge both for facilitating bending back of said wing attached thereto relative to the wedge-receiving depression and for permitting insertion of one building panel having a relatively thick cross section insertable free of fracturing, damaging and impairing strength of said second web portion including said uniform hinge portion immediately adjacent to said central member.

2. The elastomeric sealing strip of claim 1 wherein said substantially uniform portion of said second web portion has a thickness ranging between .093 inch to .100 inch and wherein said central member is at least one inch wide and has a thickness of not more than one-fourth inch while said parallel portions are approximately one inch in width and approximately one-half inch in thickness.

References Cited in the file of this patent

UNITED STATES PATENTS

| | | |
|---|---|---|
| 2,189,138 | Eichner | Feb. 6, 1940 |
| 2,255,725 | Trescher | Sept. 9, 1941 |
| 2,492,566 | Geyer | Dec. 27, 1949 |
| 2,547,799 | Wernig | Apr. 3, 1951 |
| 2,654,919 | Marvin | Oct. 13, 1953 |
| 2,660,275 | Beck | Nov. 24, 1953 |
| 2,667,951 | Gall | Feb. 2, 1954 |
| 2,693,009 | Beck | Nov. 2, 1954 |
| 2,700,197 | Kesling | Jan. 25, 1955 |

FOREIGN PATENTS

| | | |
|---|---|---|
| 630,827 | Great Britain | Oct. 21, 1949 |
| 1,079,500 | France | May 19, 1954 |